United States Patent [19]

Karcher

[11] 4,182,370
[45] Jan. 8, 1980

[54] AIR CONDITIONING CHARGING APPARATUS COUPLING

[75] Inventor: Thomas D. Karcher, Rocky River, Ohio

[73] Assignee: The Hansen Manufacturing Company, Cleveland, Ohio

[21] Appl. No.: 805,978

[22] Filed: Jun. 13, 1977

[51] Int. Cl.² ............................................. F16L 37/22
[52] U.S. Cl. ........................... 137/614.04; 137/231; 137/614.02; 137/614.03; 62/292
[58] Field of Search .................. 137/614.02, 614.03, 137/614.04, 231; 62/292

[56] References Cited

U.S. PATENT DOCUMENTS

| | | | |
|---|---|---|---|
| 1,534,862 | 4/1925 | Myers | 137/231 |
| 2,632,462 | 3/1953 | Selwyn | 137/322 |
| 2,837,350 | 6/1958 | Druge | 137/231 |
| 3,424,181 | 1/1969 | Morse | 137/68 R |
| 3,538,961 | 11/1970 | Bruce | 62/292 X |
| 3,777,782 | 12/1973 | Schendure | 137/614.02 |
| 3,916,642 | 11/1975 | Mullins | 137/318 X |
| 3,935,713 | 2/1976 | Olson | 62/77 |
| 3,976,110 | 8/1976 | White | 62/292 |

Primary Examiner—Martin P. Schwadron
Assistant Examiner—A. Michael Chambers

[57] ABSTRACT

An improved air conditioning charging apparatus includes a plug which is connected with the air conditioning system. The plug is provided with a valve of the automotive tire or Dill type to prevent leakage of refrigerant fluid from the air conditioning system. To further prevent leakage of refrigerant fluid from the air conditioning system, the threaded outer end portion of the plug is capped. When the air conditioning system is to be charged with refrigerant fluid, the cap is removed and a socket assembly which is connected to a source of refrigerant fluid under pressure is connected with the plug. To provide a secure connection between the socket assembly and the plug, an external groove is formed in the plug and is engaged by locking balls on the socket assembly. This external groove is disposed inwardly of the threaded outer end portion of the plug.

4 Claims, 3 Drawing Figures

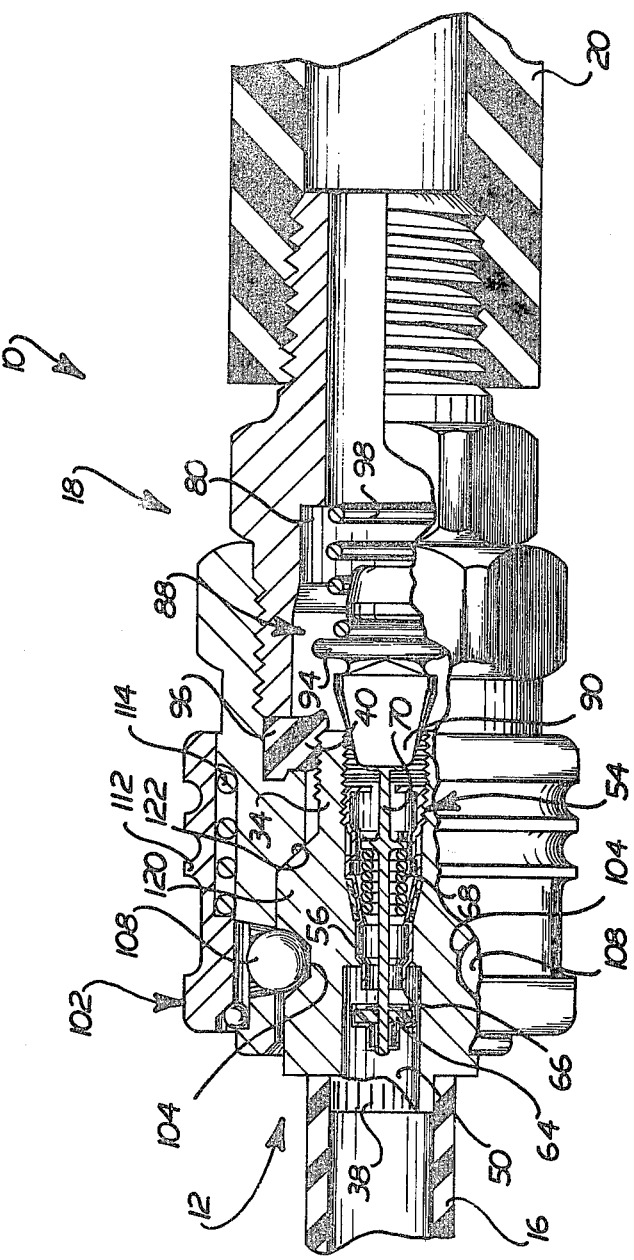
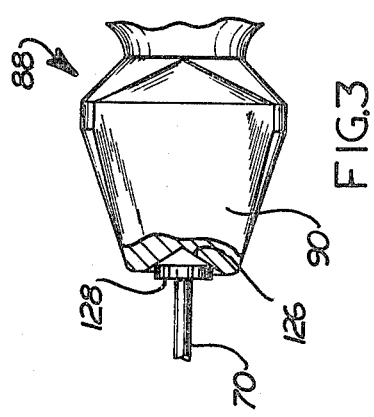
FIG. 2
FIG. 3

AIR CONDITIONING CHARGING APPARATUS COUPLING

BACKGROUND OF THE INVENTION

This invention relates to an apparatus which is used in charging and sealing an air conditioning system.

Automotive air conditioning systems are commonly charged with refrigerant. One apparatus for charging an air conditioning system with refrigerant is disclosed in U.S. Pat. No. 3,538,961. Another known apparatus which is utilized in association with an air conditioning system is disclosed in U.S. Pat. No. 3,916,642. Although these two patents disclose different types of apparatus for use in charging an air conditioning system, it is believed that difficulties may be encountered in utilizing the apparatus disclosed in these systems due to either leakage of refrigerant fluid during use of the air conditioning system or due to difficulties in providing a satisfactory connection between a source of refrigerant fluid and the air conditioning system during charging of the system. In addition to the aforementioned patents, various types of fluid pressure systems are disclosed in U.S. Pat. Nos. 2,632,462; 3,424,181; 3,935,713; and 3,976,110.

SUMMARY OF THE PRESENT INVENTION

The present invention provides a new and improved apparatus for charging and sealing an air conditioning system. The apparatus includes a plug which is connected with the air conditioning system and has an external groove to accept the locking elements of a quick disconnect socket during charging of the air conditioning system. In addition, the plug has an externally threaded outer end portion which is capped during operation of the air conditioning system to prevent leakage of fluid from the system. The combination of the external groove which is engaged by quick disconnect socket and the sealing cap enables the air conditioning system to be quickly and easily charged and sealed.

Accordingly, it is an object of this invention to provide a new and improved apparatus for charging and sealing an air conditioning system wherein the apparatus includes a plug having an external groove to accept the locking elements of a quick disconnect socket and external threads outwardly of the groove to engage internal threads on a sealing cap.

BRIEF DESCRIPTION OF THE DRAWINGS

The foregoing and other objects and features of the present invention will become more apparent upon a consideration of the following description taken in connection with the accompanying drawings wherein:

FIG. 2 is a partially broken away sectional view, similar to FIG. 1, illustrating the plug and socket assemblies in the connected condition during charging of the air conditioning system; and FIG. 3 is an enlarged fragmentary view illustrating the manner in which a valve member in the socket assembly actuates a valve member in the plug assembly.

DESCRIPTION OF ONE SPECIFIC PREFERRED EMBODIMENT OF THE INVENTION

Figure 1:
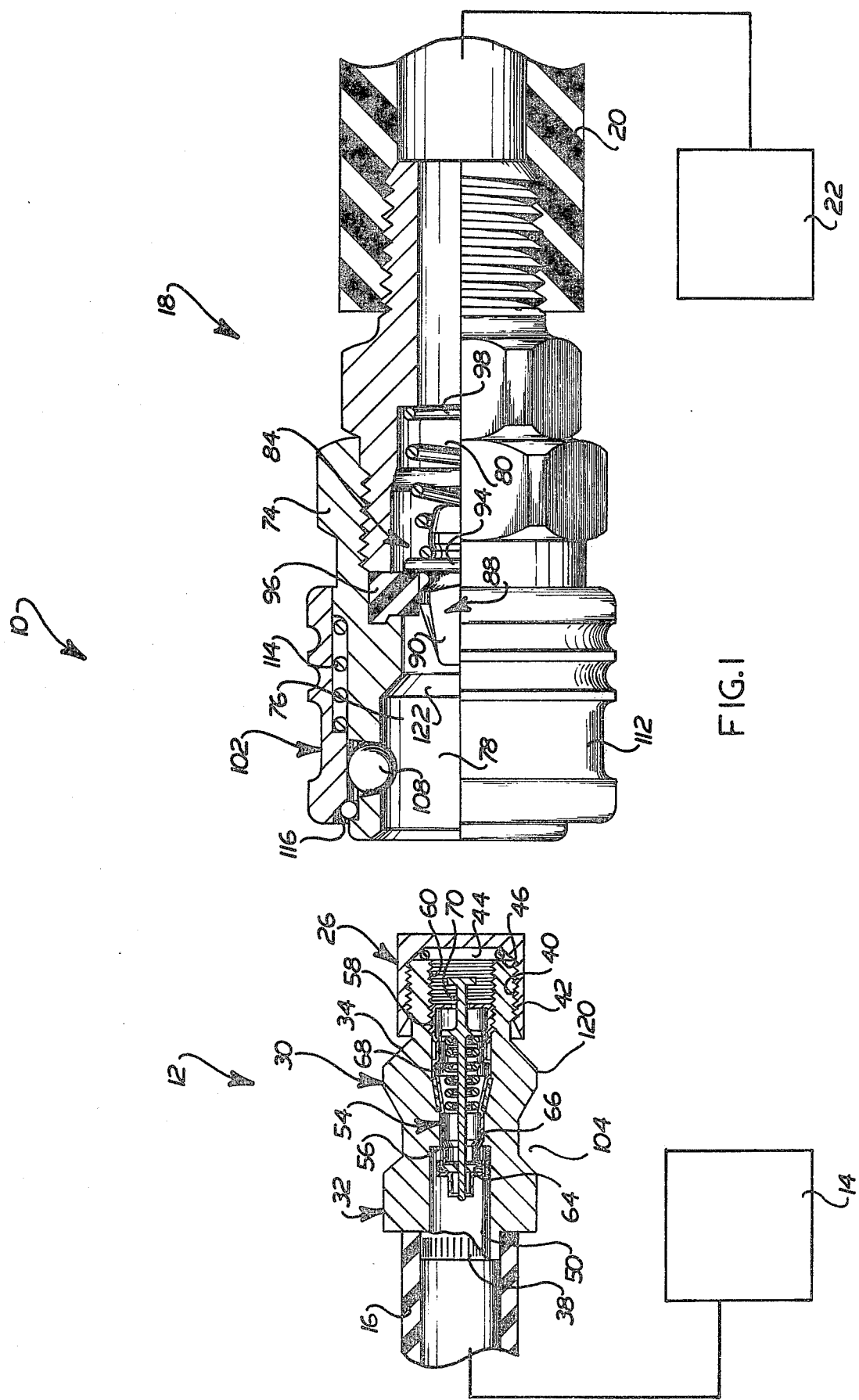
FIG. 1 is a partially broken away sectional view illustrating plug and socket assemblies which are used in charging and sealing an air conditioning system, the plug and socket assemblies being illustrated in a disconnected condition with the plug sealed by a cap.

An improved apparatus 10 for use in charging and sealing an air conditioning system is illustrated in a disconnected condition in FIG. 1. The apparatus 10 includes a plug assembly 12 which is connected with an automotive air conditioning system 14 by a suitable fluid conduit 16. A socket assembly 18 is connected with the plug assembly 12 in the manner illustrated in FIG. 2 during charging of the air conditioning system 14. The air conditioning systems is charged with a refrigerant fluid such as freon, which is supplied to the socket assembly 18 through a conduit 20 connected with a source 22 of refrigerant fluid under pressure. When the air conditioning system has been suitably charged, the socket assembly 18 is disconnected from the plug assembly 12 and a cap 26 is connected with the plug assembly to seal the air conditioning system (FIG. 1).

The plug assembly 12 includes a metal plug body 30 (FIG. 1) having a base portion 32 which is fixedly connected with the air conditioning system conduit 16 and an end portion 34 which is disposed axially outwardly of the base 32. In order to mount the plug 30 on the outer end of the conduit 16, the base portion 32 of the plug has a cylindrical knurled mounting section 38 which is pressed into the end of the conduit 16 to fixedly hold the plug assembly 12 in a coaxial relationship with the conduit. It is contemplated that the knurling may be omitted if desired. It is also contemplated that the plug assembly 12 may be mounted in the side of the conduits 16 and brazed or welded in place. It is believed that this mounting arrangement may frequently be preferred due to the freedom it gives in locating the plug assembly relative to the conduit 16.

The outer end portion 34 of the plug is provided with external thread convolutions 40 which are engaged by internal thread convolutions 42 in the cap 26. As the cap 26 is threaded onto the outer end portion 34 of the plug assembly 12, an annular sealing ring 44 inside the cap is pressed into tight sealing engagement with an annular end face 46 of the plug body 30. In addition, a metal-to-metal seal is obtained between a chamfer on the inside of the cap 26 and a similarly sloping chamfer on the outer end of the plug body 30. During operation of the air conditioning system, the cap 26 and seal ring 44 prevent leakage of any refrigerant from the conduit 16 through an axially extending passage 50 formed in the plug body 30.

A plug valve assembly 54 is mounted in the plug body 30 to block the flow of refrigerant fluid from the conduit 16 before the sealing cap 26 is connected. The plug valve assembly 54 also prevents leakage of refrigerant fluid upon removal of the sealing cap during servicing of the air conditioning system 14. The plug valve assembly 54 is of the well known tire valve type commonly referred to as a Dill valve. The plug valve assembly 54 includes a valve housing 56 having an externally threaded cylindrical end portion 58 which engages internal thread convolutions 60 formed in the outer end portion of the passage 50 through the plug body. A plug valve member 64 is pressed into tight sealing engagement with a circular valve seat 66 formed at one end of the valve housing 56 by a coil spring 68 which cooperates with a valve actuator stem 70 connected with the valve member 64. The valve housing 56, internal thread convolutions 60 and external thread convolutions 40 are all disposed in a coaxial relationship with the central passage 50 through the plug body 30.

The socket assembly 18 is of the quick disconnect type and includes a socket body 74 in which an axially extending socket chamber 76 is formed. The socket chamber 76 has an outer end portion 78 which telescopically receives the plug body 30 when the socket assembly 18 is connected with the plug assembly 12 in the manner illustrated in FIG. 2. An axially inner end portion 80 of the socket chamber 76 is connected in fluid communication with the conduit 20 and the source 22 of refrigerant fluid under pressure. A socket valve assembly 84 is disposed in the socket chamber 76 to block the flow of refrigerant fluid from the conduit 20 when the socket assembly 18 is in the disconnected condition of FIG. 1.

The socket valve assembly 84 includes a valve member 88 having a tapered outer end or nose portion 90 which actuates the plug valve assembly 54 as the socket assembly 18 is connected with the plug assembly 12. The socket valve member 88 is provided with a circular flange 94 which engages an annular valve seat 96 formed of a suitable polymeric material when the socket valve member 88 is in the closed condition illustrated in FIG. 1. The socket valve member 88 is biased toward the closed condition under the influence of a spiral coil spring 98 disposed in the socket chamber 76. When the socket valve member 88 is in the closed condition of FIG. 1, the flange 94 cooperates with the valve seat 96 to block fluid flow through the socket assembly 18.

The socket assembly 18 includes a locking arrangement 102 which holds the plug and socket assemblies 12 and 18 against relative movement when they are in the connected condition of FIG. 2. To this end, the locking arrangement 102 engages an annular, radially outwardly facing groove 104 formed in the plug body 30 axially inwardly of the externally threaded nose portion of the plug body to hold the plug and socket assemblies in the engaged or connected condition. The groove 104 is coaxial with the central passage 50 through the plug body. The locking arrangement 102 includes a plurality of locking elements 108 which, in the illustrated embodiment of the invention, are spherical balls. The balls 102 engage the groove 104 to hold the plug and socket assemblies connected.

When the socket assembly 18 is to be connected with the plug assembly 12, the cap 26 (FIG. 1) is removed. A cylindrical looking sleeve 112 is then manually retracted against the influence of a biasing spring 114 to a position in which an annular groove 106 formed in the outer end portion of the sleeve 112 is adjacent to the locking balls 108. This enables the locking balls 108 to move radially outwardly from the extended position shown in FIGS. 1 and 2 to a retracted position in which the innermost surface portion of the balls will clear the relatively large annular section 120 of the plug body as the socket assembly is moved into a telescopic relationship with the plug assembly 12. Once the annular section 120 of the plug body has moved beyond the locking balls 108, the sleeve 102 is released and the biasing spring 114 moves the sleeve axially outwardly to the locking position shown in FIG. 2. As the sleeve moves axially outwardly toward the locking position, the balls 108 are cammed radially inwardly to the extended position illustrated in FIG. 2 in which the locking balls securely engage the annular groove 104 in the plug body to hold the socket assembly against axial movement relative to the plug assembly 12. At this time, a frusto-conical stop surface 122 formed on the socket body 74 is in abutting engagement with the annular section 120 of the plug body.

As the socket assembly 18 is moved from the disconnected condition of FIG. 1 to the connected condition of FIG. 2, the plug valve assembly 54 is opened against the influence of the relatively weak biasing spring 68. After the plug valve assembly 54 has been opened, the socket valve assembly 88 is opened against the influence of the biasing spring 98 which is somewhat stronger than the biasing spring 68 used in the plug valve assembly. To provide for opening of the plug valve assembly 54 upon movement of the socket assembly to the connected condition, the socket valve 88 is provided with a conical actuator surface 126 (see FIG. 3) which engages a circular disc 128 on an outer end portion of the plug valve stem 70. The conical configuration of the actuator surface 126 tends to center the plug valve stem 70 in axial alignment with the socket assembly 18.

Thus, as the plug and socket assemblies are connected, the leading end of the socket valve 88 enters the passage 50 formed in the plug body 30 and the actuator surface 126 on the socket valve engages and centers the plug valve stem 70. Continued movement of the socket assembly causes the valve stem 70 to be moved axially inwardly to move the plug valve member 64 from the closed condition (FIG. 1) blocking fluid flow through the passage 50 to the open condition (FIG. 2) enabling fluid to flow through the passage 50. Still further movement of the socket 18 toward the plug assembly 12 causes the socket valve member 88 to be pressed inwardly from the closed condition of FIG. 1 toward the open condition of FIG. 2 against the influence of the biasing spring 98. As this occurs, the outer end face 46 and threaded outer end portion of the plug body 30 are pressed into tight sealing engagement with the annular valve seat 96. This prevents leakage of refrigerant fluid around the plug body 30.

When the plug and socket assembly is in the connected condition of FIG. 2, refrigerant fluid flows under pressure from the source 22 through the conduit 20 to the inner end portion 80 of the socket chamber 76. This fluid then flows around the open valve member 88 and into the plug body 30. It should be noted that the valve member 88 has flat side surfaces (only one of which is visible in FIG. 2) which provide clearance for the refrigerant to flow into the open end of the plug passage 50. The refrigerant fluid then flows into the plug valve housing 56, through the circular seat 66, and past the open valve member 64. Fluid then flows through the axially inner end of the passage 50 into the conduit 16 which is connected in fluid communication with the vehicle air conditioning system 14.

When the vehicle air conditioning system has been charged with refrigerant fluid, the plug and socket assemblies are disconnected. This is accomplished by pulling back the locking sleeve 102 so that the locking balls 108 move radially outwardly to their retracted positions to thereby release the socket assembly 18 for movement relative to the plug assembly 12. As the socket assembly is moved away from the plug assembly 12, the outer end portion of the plug body 30 is disengaged from the socket valve seat 96 and the socket valve member 88 closes against the socket valve seat. The plug valve 54 then closes to block the flow of refrigerant fluid from the conduit 16 through the plug assembly 12. Once the socket assembly 18 has been completely disengaged from the plug assembly, the cap 26 is threaded onto the outer end portion of the plug assembly 12 to seal the plug assembly and to prevent any leakage of refrigerant fluid from the air conditioning system 14.

It should be noted that the external thread convolutions 40 on the plug are disposed axially outwardly of the retaining groove 104. This enables the threaded end portion of the plug body to be engaged by the cap. By having the groove 104 disposed inwardly of the thread convolution 40, the outer end portion of the plug will sealingly engage the socket valve seat 96 when the locking elements 108 are in engagement with the annular groove 104.

In view of the foregoing description it can be seen that the apparatus 10 can be used to charge and seal an air conditioning system. The apparatus includes a plug assembly 12 which is connected with the air conditioning system 14 and has an external groove 104 to accept the locking elements 108 of a quick disconnect socket assembly 18 during charging of the air conditioning system. In addition, the plug assembly 12 has an externally threaded outer end portion 34 which is sealed by a cap 26 during operation of the air conditioning system 14 to prevent leakage of fluid from the system. The combination of the external groove 104 which is engaged by quick disconnect socket assembly 18 and the sealing cap 26 enables the air conditioning system 14 to be quickly and easily charged and sealed.

Having described one specific preferred embodiment of the invention, the following is claimed:

1. An apparatus for use in charging and sealing an air conditioning system, said apparatus comprising plug means for conducting fluid to an air conditioning system during charging of the system and for at least partially blocking a flow of fluid from the air conditioning system after charging of the system, said plug means including a plug body having a base end portion adapted to be fixedly connected with the air conditioning system and an outer end portion, said outer end portion of said plug body including a plurality of external thread convolutions and an annular radially outwardly facing groove disposed between said external thread convolutions and said base end portion of said plug body, said annular groove having an area in a radial plane which is greater than the area between adjacent thread convolutions in the same plane, said plug body including internal surface means for defining a passage extending through said plug body, said passage in said plug body being disposed in a coaxial relationship with and circumscribed by said external thread convolutions and said annular groove, plug valve means disposed in said passage and operable between an open condition enabling fluid to flow through said passage and a closed condition at least partially blocking fluid flow through said passage, socket means for connecting a source of fluid under pressure with said plug means during charging of the air conditioning system, said socket means being movable between a connected condition engaging said plug means and a disconnected condition in which said socket means is spaced apart from said plug means, said socket means including a socket body having internal surface means defining a socket chamber having an outer portion for telescopically receiving said plug means when said socket means is in the connected condition and an inner portion connected in fluid communication with the source of fluid under pressure, said socket means further including means for actuating said plug valve means from the closed condition to the open condition upon movement of said socket means to the connected condition and locking means for holding said plug and socket means against axial movement relative to each other when said socket means is in the connected condition, said locking means including a plurality of locking elements disposed on said socket body and movable between the extended condition and a retracted condition, said locking elements extending into said socket chamber and into engagement with said annular groove on said plug body to hold said plug and socket bodies against axial movement relative to each other when said locking elements are in the extended condition and said socket means is in the connected condition, said locking elements being spaced apart from said annular groove in said plug body to enable relative movement to occur between said plug and socket bodies when said socket means is in the disconnected condition, said socket means including seal means disposed in said socket chamber for sealingly engaging a plurality of said external thread convolutions on said plug body, said seal means having a central opening in which said outer end portion of said plug body is telescopically received, and cap means for sealingly engaging said plug means when said socket means is in the disconnected condition, said cap means including internal thread convolutions which engage the external thread convolutions on the outer end portion of said plug means to hold said cap means in engagement with said plug means.

2. An apparatus as set forth in claim 1 wherein said internal surface means of said socket body includes a cylindrical surface which engages said plug body at a location between said external thread convolutions and said annular groove to hold said plug body against sidewise movement relative to said socket body.

3. An apparatus as set forth in claim 1 wherein said annular groove has an axial extent which is greater than the axial distance between adjacent external thread convolutions.

4. An apparatus for use in charging and sealing an air conditioning system, said apparatus comprising plug means for conducting fluid to an air conditioning system during charging of the system and for at least partially blocking a flow of fluid from the air conditioning system after charging of the system, said plug means including a plug body having a base end portion adapted to be fixedly connected with the air conditioning system and an outer end portion, said outer end portion of said plug body including a plurality of external thread convolutions and an annular radially outwardly facing groove disposed between said external thread convolutions and said base end portion of said plug body, said annular groove being separated from said external thread convolutions by a side surface area on said plug body, said plug body including internal surface means for defining a passage extending through said plug body, said passage in said plug body being disposed in a coaxial relationship with and circumscribed by said external thread convolutions and said annular groove, plug valve means disposed in said passage and operable between an open condition enabling fluid to flow through said passage and a closed condition at least partially blocking fluid flow through said passage, socket means for connecting a source of fluid under pressure with said plug means during charging of the air conditioning system, said socket means being movable between a connected condition engaging said plug means and a disconnected condition in which said socket means is spaced apart from said plug means, said socket means including a socket body having internal surface means defining a socket chamber having an outer portion for telescopically receiving said plug means when said socket means is in the connected condition and an inner portion connected in fluid communication with the source of fluid under pressure, said outer portion of said socket chamber including surface means for engaging said side surface area of said plug body to hold said plug body against sidewise movement relative to said socket body when said socket means is in the connected condition, said socket means further including means for actuating said plug valve means from the closed condition to the open condition upon movement of said socket means to the connected condition and locking means for holding said plug and socket means against axial movement relative to each other when said socket means is in the connected condition, said locking means including a plurality of locking elements disposed on said socket body and movable between an extended condition and a retracted condition, said locking elements extending into said socket chamber and into engagement with said annular groove on said plug body to hold said plug and socket bodies against axial movement relative to each other when said locking elements are in the extended condition and said socket means is in the connected condition, said locking elements being spaced apart from said annular groove in said plug body to enable relative movement to occur between said plug and socket bodies when said socket means is in the disconnected condition, and said socket means including seal means disposed in said socket chamber for sealingly engaging a plurality of said external thread convolutions on said plug body, said seal means having a central opening in which said outer end portion of said plug body is telescopically received, cap means for sealingly engaging said plug means when said socket means is in the disconnected condition, said cap means including internal thread convolutions which engage the external thread convolutions on the outer end portion of said plug means to hold said cap means in engagement with said plug means.

* * * * *